United States Patent
Narayanam et al.

(10) Patent No.: US 10,606,903 B2
(45) Date of Patent: Mar. 31, 2020

(54) MULTI-DIMENSIONAL QUERY BASED EXTRACTION OF POLARITY-AWARE CONTENT

(71) Applicant: International Business Machines Corporation, Armonk, NY (US)

(72) Inventors: Krishnasuri Narayanam, Bangalore (IN); Ramasuri Narayanam, Andhra Pradesh (IN); Mukundan Sundararajan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 15/816,545

(22) Filed: Nov. 17, 2017

(65) Prior Publication Data

US 2019/0155912 A1    May 23, 2019

(51) Int. Cl.
| | |
|---|---|
| *G06F 16/20* | (2019.01) |
| *G06F 16/93* | (2019.01) |
| *G06F 16/248* | (2019.01) |
| *G06F 16/28* | (2019.01) |
| *G06F 16/2457* | (2019.01) |
| *G06F 16/33* | (2019.01) |

(52) U.S. Cl.
CPC ............ *G06F 16/93* (2019.01); *G06F 16/248* (2019.01); *G06F 16/24578* (2019.01); *G06F 16/283* (2019.01); *G06F 16/3334* (2019.01); *G06F 16/3344* (2019.01)

(58) Field of Classification Search
None
See application file for complete search history.

(56) References Cited

U.S. PATENT DOCUMENTS

| | | | |
|---|---|---|---|
| 8,589,069 B1* | 11/2013 | Lehman | G01C 21/20 701/438 |
| 2014/0114962 A1* | 4/2014 | Rosenburg | G06Q 10/063 707/723 |

(Continued)

OTHER PUBLICATIONS

Alchemy-api:, retrieved from https://www.npmjs.com/package/alchemy-api, at least as early as Nov. 2017.

(Continued)

*Primary Examiner* — Jau Shya Meng
(74) *Attorney, Agent, or Firm* — Brown & Michaels, PC; Christopher Pignato (57) ABSTRACT

A method of multi-dimensional query based extraction of polarity-aware content from a plurality of documents. An input query tuple comprising: at least one keyword, polarity, and quantification of polarity corresponding to a polarity score is received from a user via an interface. A search of metadata of indexed documents based on the input query tuple is conducted to identify documents which satisfy at least some of the input query tuple. For each document which satisfies at least some of the input query tuple from the user, keywords, polarity associated with the keywords, and excerpts of each of the documents including the keywords and text containing polarity context associated with the keywords are extracted and for each document which satisfies at least some of the input of the input query tuple, the query results to the user via the user interface are outputted.

15 Claims, 7 Drawing Sheets

(56) References Cited

U.S. PATENT DOCUMENTS

2015/0227528 A1* 8/2015 Kang ................. G06F 17/27
707/750
2017/0011029 A1 1/2017 Chatterjee et al.

OTHER PUBLICATIONS

'AlchemyLanguage', retrieved from https://alchemy-language-demo.mybluemix.net/, as early as Oct. 2016.
Kempe et al. "Maximizing the Spread of Influence through a Social Network" SIGKDD; 2003.
Leskovec et al. "The Dynamics of Viral Marketing" ACM Trans. Web, 1, 1, Article 5 (May 2007), 39 pages.
Chen et al. "Efficient Influence Maximization in Social Networks" KDD; 2009.
Abu-Jbara et al. "Purpose and Polarity of Citation: Towards NLP-based Bibliometrics" HLT-NAACL, 2013.
Radev et al. "The ACL anthology network corpus. Language Resources and Evaluation" Language Resources and Evaluation. vol. 47, Issue 4 , pp. 919-944.
SweSum—Automatic Text Summarizer by Martin Hassel and Hercules Dalianis, retrieved from http://swesum.nada.kth.se/index-eng-adv.html;at least as early as Nov. 2017.

* cited by examiner

MULTI-DIMENSIONAL QUERY BASED EXTRACTION OF POLARITY-AWARE CONTENT

BACKGROUND

The present invention relates to multi-dimensional queries, and more specifically to multi-dimensional query based extraction of polarity-aware content from documents.

Citation of relevant contents is common in online social networks such as blogs, discussion forums, scientific articles and other written documents. Content recommendation to a user based on a search is often not useful or irrelevant as the existing search systems do not consider simultaneously the context and the polarity or sentiment of the content.

For example, if one were to consider three well known papers in the domain of "viral marketing through social networks": Paper 1, Paper 2, and Paper 3 all regarding a same topic, for example "Greedy Algorithm for viral marketing", each paper may present different context and polarity relative to the topic of the paper. For example, the version of the greedy algorithm presented in Paper 1 is highly inefficient in terms of running time; whereas the versions of the greedy algorithm presented in Paper 2 and Paper 3 are highly efficient.

In one example, a user may be writing a blog post (or a survey article) on the use of greedy algorithm for viral marketing purposes and is searching for articles in which to cite or base their post on. Based on the user's query using a prior art system, all three papers, Paper 1, Paper 2, and Paper 3, would be recommended, as the system cannot distinguish between Paper 1 with a negative polarity based on the context of the article (e.g. inefficiency in terms of running time of the greedy algorithm) and Papers 2 and 3 with a positive polarity based on context (e.g. high efficiency in running the greedy algorithm).

SUMMARY

According to one embodiment of the present invention a method of multi-dimensional query based extraction of polarity-aware content from a plurality of documents is disclosed. The method comprising the steps of: a computer receiving an input query tuple comprising: at least one keyword, polarity, and quantification of polarity corresponding to a polarity score from a user via an interface; the computer searching metadata of indexed documents based on the input query tuple to identify documents which satisfy at least some of the input query tuple; for each document which satisfies at least some of the input query tuple from the user, the computer extracting keywords, polarity associated with the keywords, and excerpts of each of the documents including the keywords and text containing polarity context associated with the keywords; and the computer outputting for each document which satisfies at least some of the input of the input query tuple, the query results to the user via the user interface.

According to another embodiment of the present invention, a computer program product for multi-dimensional query based extraction of polarity-aware content from a plurality of documents executed by a computer is disclosed. The computer comprising at least one processor, one or more memories, one or more computer readable storage media, the computer program product comprising a computer readable storage medium having program instructions embodied therewith. The program instructions executable by the computer to perform a method comprising: receiving, by the computer, an input query tuple comprising: at least one keyword, polarity, and quantification of polarity corresponding to a polarity score from a user via an interface; searching, by the computer, metadata of indexed documents based on the input query tuple to identify documents which satisfy at least some of the input query tuple; for each document which satisfies at least some of the input query tuple from the user, extracting, by the computer, keywords, polarity associated with the keywords, and excerpts of each of the documents including the keywords and text containing polarity context associated with the keywords; and outputting, by the computer, for each document which satisfies at least some of the input of the input query tuple, the query results to the user via the user interface.

According to another embodiment of the present invention a computer system for multi-dimensional query based extraction of polarity-aware content from a plurality of documents is disclosed. The computer system comprising a computer comprising at least one processor, one or more memories, one or more computer readable storage media having program instructions executable by the computer to perform the program instructions. The program instructions comprising: receiving, by the computer, an input query tuple comprising: at least one keyword, polarity, and quantification of polarity corresponding to a polarity score from a user via an interface; searching, by the computer, metadata of indexed documents based on the input query tuple to identify documents which satisfy at least some of the input query tuple; for each document which satisfies at least some of the input query tuple from the user, extracting, by the computer, keywords, polarity associated with the keywords, and excerpts of each of the documents including the keywords and text containing polarity context associated with the keywords; and outputting, by the computer, for each document which satisfies at least some of the input of the input query tuple, the query results to the user via the user interface.

DETAILED DESCRIPTION

In an embodiment of the present invention, a method of a framework of a multi-dimensional query uses a query string, contextual polarity associated with query and the quantification of the contextual polarity to obtain search results for recommending content to the user as well as a method of extracting the contextual polarity or sentiment contents using the framework of multi-dimensional queries is disclosed. The results of the query preferably include a quantification of polarity (score) for each keyword/phrase, polarity aware contents (specific keywords/phrases), an excerpt from the document including the polarity aware contents, and the sentiment or polarity associated with the phrases or keywords.

In an embodiment of the present invention, polarity context analysis is used to determine the attitude or sentiment of a speaker, writer, or other subject with respect to some topic, as well as the overall contextual polarity, sentiment or emotional reaction to a document, interaction, or event.

In an embodiment of the present invention, multi-dimensional query based extraction of polarity-aware contents is executed by using a multi-dimensional query framework that takes three tuples in the format of <Query, Polarity, Quantification_of_Polarity> where "Query" is a collection of keywords or phrases, "Polarity" can be positive, negative, or neutral sentiment; and "Quantification_of_Polarity" can take a value between 0 to 100 representing the polarity. In contrast to the traditional search engines which perform the search based on the keywords, in an embodiment of the present invention, the system performs a context aware keyword search controlled by a threshold parameter. The multi-dimensional query is received through a user interface, for example on a webpage, in which a user enters a phrase, contextual polarity of the phrase or keyword, and quantification of the polarity or sentiment. The system of the present invention supports natural language user input, and natural language system output as well as support dialog with user while interacting (e.g. context from one question to another question is maintained). Contents of documents are automatically extracted that match with both the context and the polarity of the multi-dimensional query input. The content may be present in documents which are in multiple languages and translated automatically.

The results of the query may undergo polarization analysis by reviewing the retuned materials from standard search engines that do not support polarity and quantified polarity reporting. This provides the additional processing needed in addition to the traditional search results, prior to outputting the results of the polarity search processing.

The results of the query provide context and polarity which can be used to gain additional insight into the context of the electronic document and to aid in recommending content to a user and possibly aid in customizing ads associated with the electronic documents that would be relevant to the readers of the electronic documents.

Figure 1:
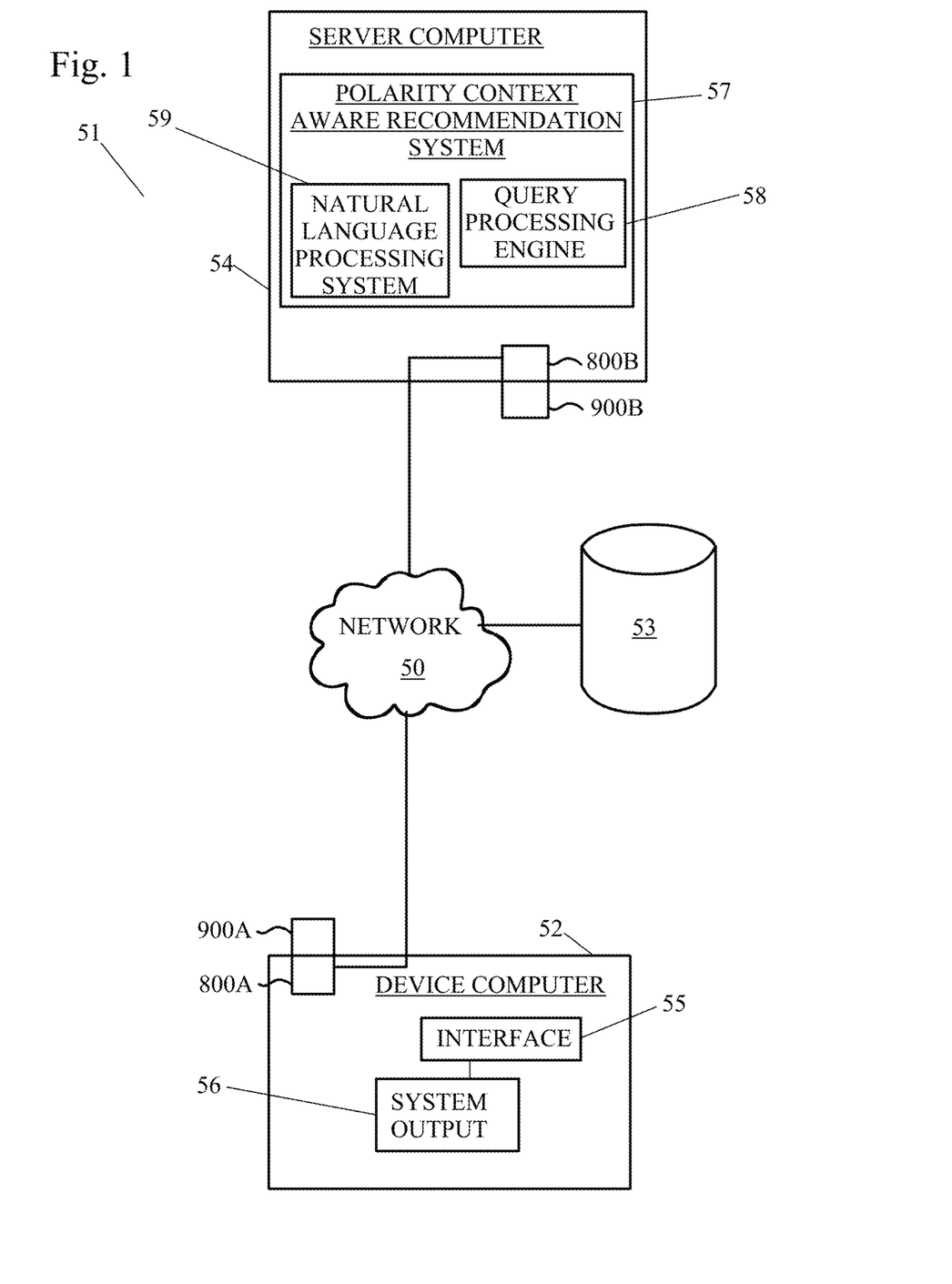
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regards to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Figure 5:
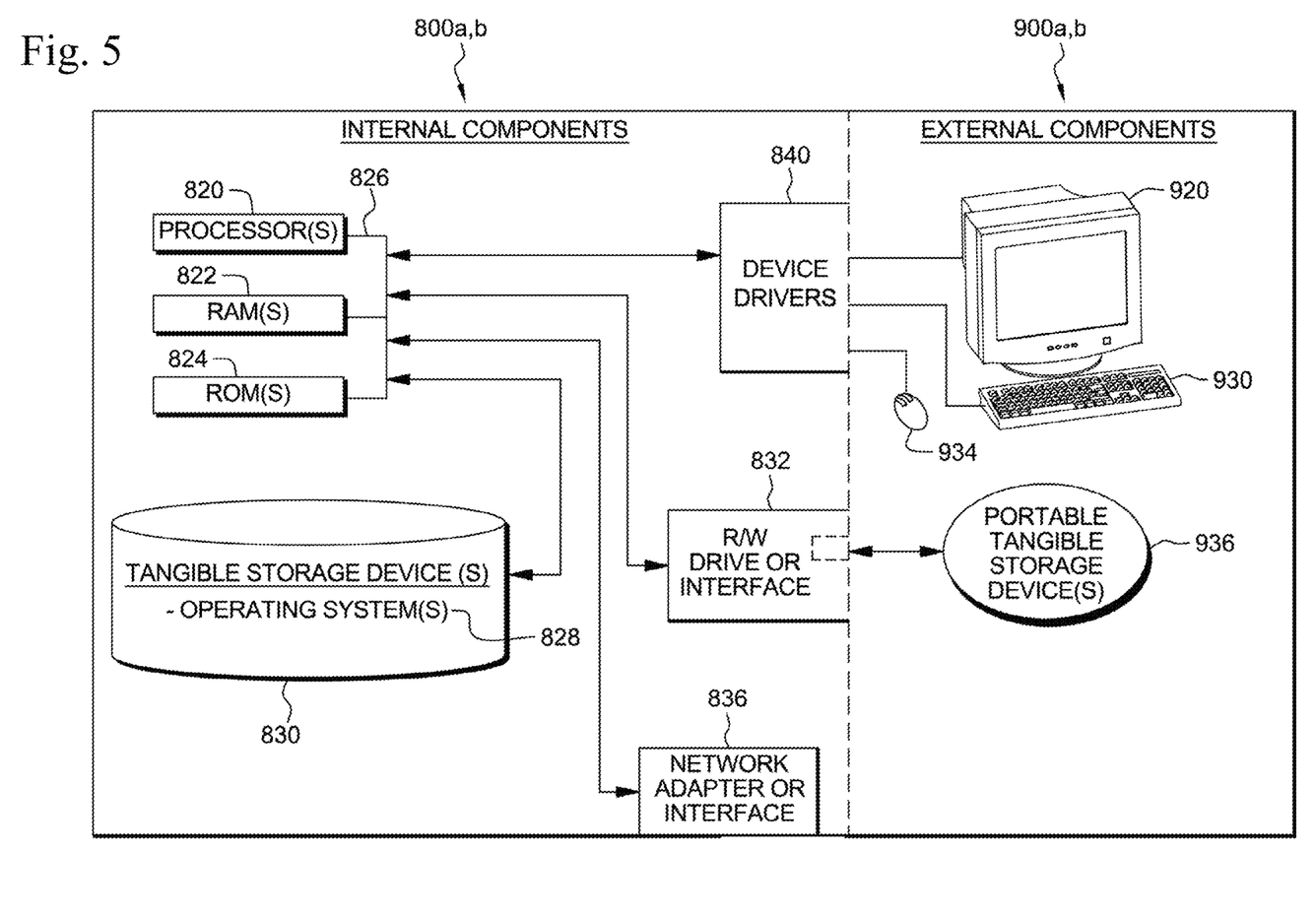
FIG. 5 illustrates internal and external components of a client computer and a server computer in which illustrative embodiments may be implemented.

The device computer 52 includes a set of internal components 800a and a set of external components 900a, further illustrated in FIG. 5. The device computer 52 may contain a user interface 55, which may accept commands and data entry from a user and display an output of query results to the user in response to the multi-dimensional query. The commands preferably include a multi-dimensional query of at least one tuple of: a query containing one or more words, polarity, and a polarity score representing a quantification of the polarity, for example between 0 and 100, in which 100 being an absolute match for sentiment and 0 being no match for sentiment. The quantification of polarity or sentiment for specific keywords and phrase may be predetermined and present in a lookup table. Given a document, it is possible to find the polarity and its score using application program interfaces (API's) and open source tools available. The query may receive a limited number of characters. The polarity may be positive, negative or neutral. Additional input may be provided by the user for the multi-dimensional query, such as, which dimension to process first, how much weightage to give for each dimension of the search, and other information.

The interface 55 can be, for example, a command line interface, a graphical user interface (GUI), a natural user interface (NUI) or a touch user interface (TUI). The input can also be provided by the user in natural language via voice input. For example, in one embodiment, a speech-to-text service can be used to convert a user multi-dimensional query input by voice commands into text format.

The interface 55 can also provide a system output 56 or search results of the query to the user. The output includes search result blocks each having keywords which match the query, a keyword polarity score and preferably an excerpt from the search result including the keywords and phrases of the document associated with the polarity or sentiment of the query. The keywords of the output are a list of keywords synthesized from the user input search query. The keywords may be synonyms for the keywords provided as input in the query. The keyword polarity score is present for all of the keywords which are present in both the synthesized keywords list and in the document to be outputted to the user. In one embodiment, the system could provide the system output in natural language via voice output (at least for question & answer type of searches) via a text-to-speech service.

The user multi-dimensional query is used as a filter when searching through documents in a document database to obtain documents which satisfy the multi-dimensional query and presents to the user a query response or output.

The output includes search result blocks each having keywords which match the query, a keyword polarity score and preferably an excerpt from the search result including the keywords and phrases of the document associated with the polarity or sentiment of the query. Additional matching criteria other than the specified score in the input query may also be presented as part of the search result output. An example of additional matching criteria may include matching synonyms. There may be more than one document that is to be presented to the user, in response to the search query.

The documents are preferably ordered with the output of the query result with the more relevant documents (e.g. highest polarity score) appearing at the top or first in the presentation of the output of the query results to the user. In other words, sorting the query results in descending order based on polarity score. In an embodiment, rank and retrieve document indexing tool may be used to order in which the search results are displayed within the interface to the user. After the documents have been ranked in descending order based on polarity score, the documents may be reordered within the displayed, and outputted search results may be further ordered based on the following criteria:

1) Document that contains all the keywords/phrases of the search query (with matching polarity as input by the user, and having polarity score more than the score input by the user) are presented at the top of the outputted search results. In an embodiment, if more than one such document with the above criteria is to be presented to the user, the documents which contain a smaller number of keywords which are not specified in the query may be given more priority.

2) The documents that contain some, but not all the search keywords/phrases (but contain the search keyword/key part of the phrase with matching inputted polarity along with the polarity score) may be presented further down in the ordered list of outputted search and after the documents which match the criteria of 1).

3) The documents that contain not all the search keywords/phrases (but contain the search keyword/phrase with matching input polarity only and do not meeting the polarity score criteria) are presented after the documents which match the criteria in 1) and 2).

4) The documents that contain the keywords/phrase, but do not contain the required polarity or polarity score appear after the search results which match the criteria of documents in 1), 2) and 3). In an embodiment, even if the keywords of the query are not present in a document with matching sentiment as input by the user, the document is included in the output only if most of the other keywords of the query are present in that document with the matching polarity and polarity score as input by the user.

While these additional filter criteria using polarity and polarity score are applied on the output of the multidimensional query, other criteria may also be used to further order the results, such as document reference counts, user click patterns and other techniques.

By outputting the search results based on the above criteria, the results of the query provide context and polarity which can be used to gain additional insight into the context of the electronic document and to aid in recommending content to a user and possibly aid in customizing ads associated with the electronic documents that would be relevant to the readers of the electronic documents.

Figure 6:
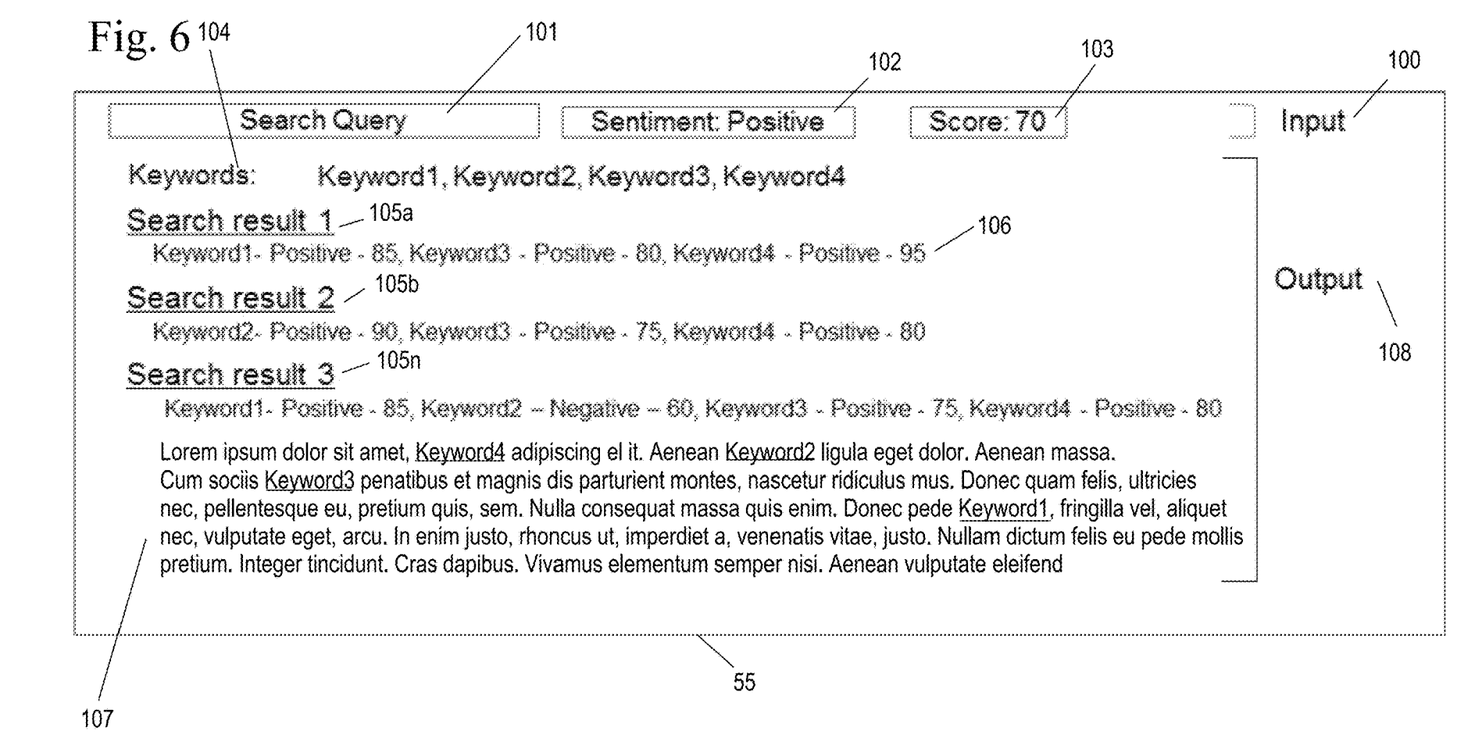
FIG. 6 shows an example of a user interface design of the user interface component of the system.

FIG. 6 shows an example of a user interface design of the user interface component 55 of the system.

The input 100 provided by the user includes a search query 101, a polarity 102, and polarity score 103. In this case, the polarity 102 is positive, the polarity score 103 is seventy and the query 101 includes an input of: Keyword1, Keyword2, Keyword3 and Keyword4. The keywords of the query 101 could be specific words, a phrase or a plurality of phrases, or a combination of specific words and phrases.

The system outputs 108 the list of keywords 104 from the search which were searched for (e.g. Keyword1, Keyword2, Keyword3, Keyword4); search result blocks 105-105n (e.g. search result 1, 2, 3) with scores for each of the keywords 106 present within the search results, and preferably excerpts 107 containing the keywords.

Referring back to FIG. 1, server computer 54 includes a set of internal components 800b and a set of external components 900b illustrated in FIG. 5. In the depicted example, server computer 54 provides information, such as boot files, operating system images, and applications to the device computer 52. Server computer 54 can compute the information locally or extract the information from other computers on network 50. The server computer preferable includes a polarity and context aware recommendation system 57. The polarity and context aware recommendation system 57 includes a query processing engine 58 with a query program 66 and a natural language processing system 59.

In some embodiments, the natural language processing system 59 may include numerous subcomponents, such as a tokenizer, a part-of-speech (POS) tagger, a semantic relationship identifier, and a syntactic relationship identifier. An example natural language processor is discussed in more detail in reference to FIG. 7.

Figure 7:
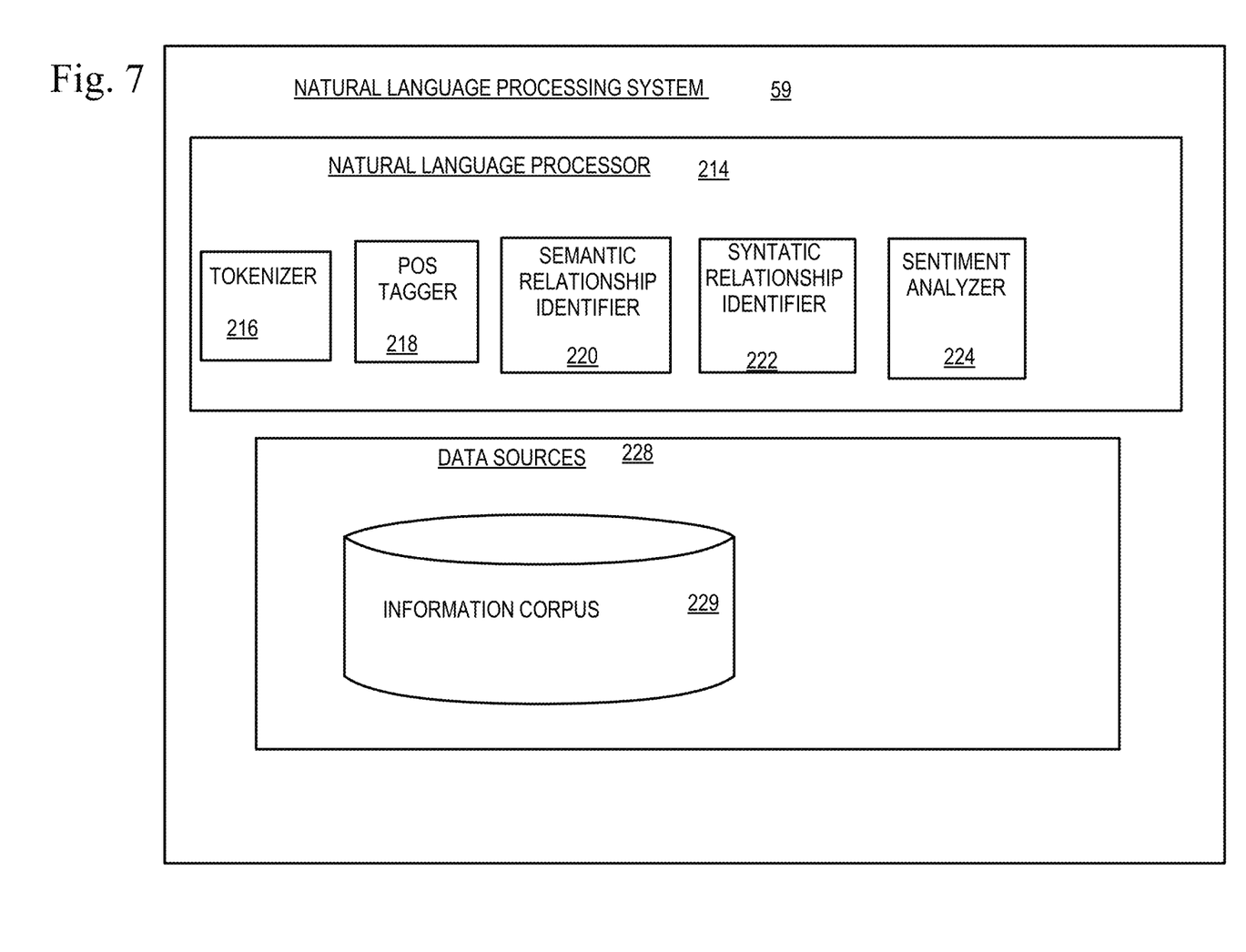
FIG. 7 shows block diagram of an exemplary system architecture, including a natural language processing system, configured to use a query tuple to extract polarity aware content, in accordance with embodiments of the present disclosure.

Referring now to FIG. 7, shown is a block diagram of a natural language processing system 59, configured to the query tuple to rank query results based on polarity context in accordance with embodiments of the present disclosure. The natural language processing system 59 may include a natural language processor 214. The natural language processor 214 may be a computer module that analyzes electronic documents. The natural language processor 214 may perform various methods and techniques for analyzing electronic documents (e.g., syntactic analysis, semantic analysis, etc.). The natural language processor 214 may be configured to recognize and analyze any number of natural languages. In some embodiments, the natural language processor 214 may parse passages of the documents. Further, the natural language processor 214 may include various modules to perform analyses. These modules may include, but are not limited to, a tokenizer 216, a part-of-speech (POS) tagger 218, a semantic relationship identifier 220, a syntactic relationship identifier 222, and sentiment analyzer 224.

In some embodiments, the tokenizer 216 may be a computer module that performs lexical analysis. The tokenizer 216 may convert a sequence of characters into a sequence of tokens. A token may be a string of characters included in an electronic document and categorized as a meaningful symbol. Further, in some embodiments, the tokenizer 216 may identify word boundaries in an electronic document and break any text passages within the document into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech or polarity context. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed electronic documents (e.g., the content of document may shed light on the meaning of text elements in another document, particularly if they are documents are regarding a same product). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by other components of the natural language processing system 212.

In some embodiments, the semantic relationship identifier 220 may be a computer module that is configured to identify semantic relationships of recognized text elements (e.g., words, phrases) in documents. In some embodiments, the semantic relationship identifier 220 may determine functional dependencies between entities and other semantic relationships.

Consistent with various embodiments, the syntactic relationship identifier 222 may be a computer module that is configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

Consistent with various embodiments, the sentiment analyzer 224 may be a computer module that is configured to identify and categorize the sentiments associated with tokens or keywords of interest. In some embodiments, the sentiment analyzer may be configured to identify, within text passages, and annotate keywords that are preselected as high quality indicators of sentiment polarity (e.g., indicators of positive sentiment could include brilliant, excellent, or fantastic). Various tools and algorithms may be used the sentiment analyzer 224 as are known to those skilled in the art (e.g., Naïve Bayes lexical model).

In some embodiments, the output of the natural language processor 214 may be stored as an information corpus 229 in one or more data sources 228. In some embodiments, data sources 228 may include data warehouses, information corpora, data models, and document repositories. The information corpus 229 may enable data storage and retrieval. In some embodiments, the information corpus 229 may be a storage mechanism that houses a standardized, consistent, clean, and integrated copy of the ingested and parsed electronic documents. Data stored in the information corpus 229 may be structured in a way to specifically address analytic requirements. For example, the information corpus 229 may store the electronic documents with metadata in order to make ranking the documents by polarity context easier. In some embodiments, the information corpus 229 may be a relational database.

Figure 2:
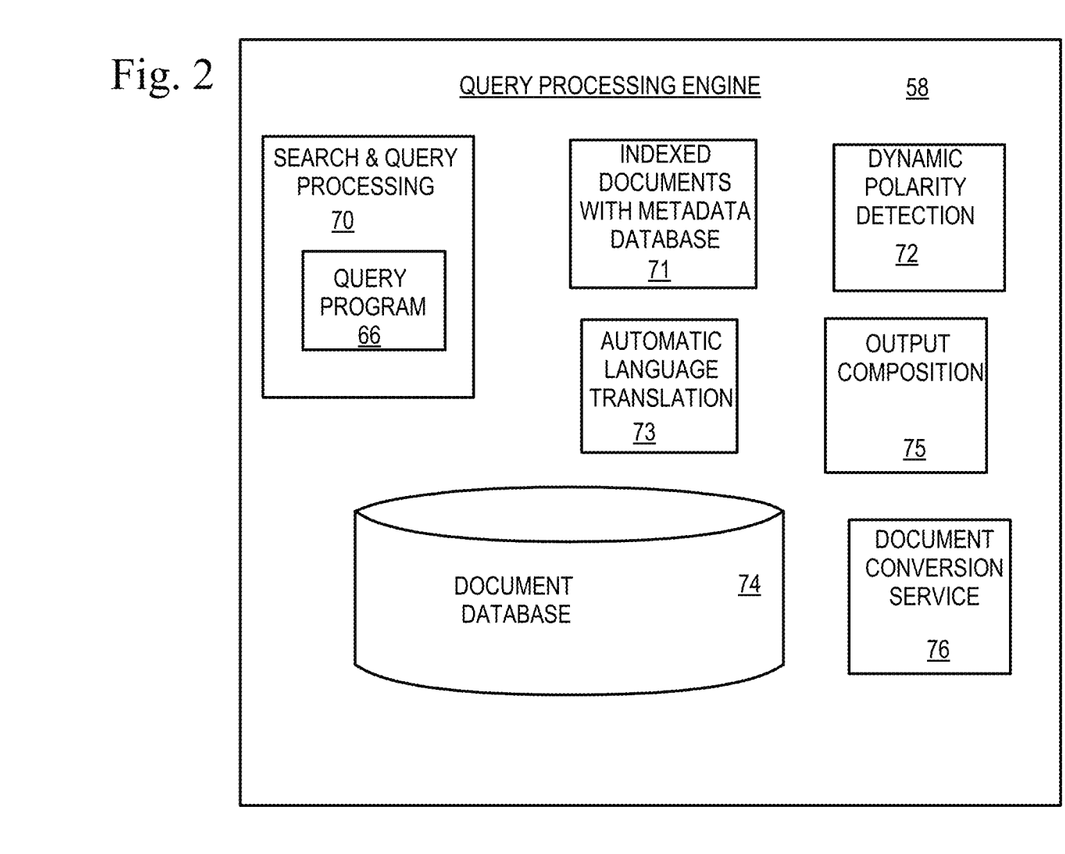
FIG. 2 shows a diagram of the components of the query processing engine.

FIG. 2 shows a diagram of the components of the query processing engine 58. The query processing engine 58 is preferably in communication with the natural language processing system 59. While the natural language processing system 59 is shown as being separate from the query processing engine 58, the natural language processing system 59 may be integrated into the query processing engine 58. The query processing engine 58 includes a search and query processing function 70 processed via a query program 66, an automatic language translation function 73, a dynamic polarity detection function 72, a database with indexed documents and associated metadata 71, a document database 74 and an output composition function 75.

The document database 74 contains the set of electronic documents on which the query search is to be processed (typically contains all the electronic documents on the web). Electronic documents may be pre-processed and the content of the documents may be extracted, and organized in a specific format for ease of access and processing later on.

In one embodiment, a document conversion service 76, which may be part of the query processing engine 58, can be used to convert the pdf/html/doc files to JSON format. Documents in different languages may also be used in the query processing as source documents and a language translation service via the automatic language translation function 73 could be used to convert the documents in different languages into single language for use in the search process.

The search and query processing function 70 synthesizes, via the query program 66, the search query received by the user to extract list of keywords to be searched in the documents. In an embodiment, a text analysis service of the search and query processing function 70 can detect and extract information such as concepts, entities, sentiment, and keywords. More specifically, a text analysis service function of 'Keyword Extraction' can be used to list the set of keywords to be used during document search by applying this function on the user search query.

If the search query has multiple search strings corresponding to multiple dimensions of user's query, each search string is synthesized independently and the union of keywords is used for a document search later.

User input and search engine response could be in a dialog (sequence of queries and response in a given context) and may be extracted from the dialog.

The database with indexed documents and associated metadata 71 contains extracted keywords present in each electronic document, along with the keyword polarity/sentiment and score.

Electronic documents are indexed within the database 71 so that the keyword search on the electronic documents is executed faster, improving the function of a processor. In an embodiment, a rank and retrieve service could be used to achieve this functionality. It should be noted that indexing of documents with the associated documents is a one-time activity for each electronic document in the database.

The dynamic polarity detection function 72 uses natural language processing as discussed above in reference to FIG. 2 to determine polarity or sentiment in each of the documents. It is possible that a document evolves over time (e.g., a web-page, or a blog). In such scenarios, the polarity for different keywords of that document may be computed multiple times whenever there is a change in this document. Thus, the polarity detection module is dynamic in nature.

The output composition function 75 is used to output the query results to the user via the user interface 55. As described above, the search results are tailored to the user based on the user's query. The search results may be further ordered by a rank and retrieve service of the output composition function 75.

Program code and programs such as query program 66 may be stored on at least one of one or more computer-readable tangible storage devices 830 shown in FIG. 5, on at least one of one or more portable computer-readable tangible storage devices 936 as shown in FIG. 5, or on storage unit 53 connected to network 50, or may be downloaded to a device computer 52 or server computer 54, for use. For example, program code and programs such as query program 66 may be stored on at least one of one or more storage devices 830 on server computer 54 and downloaded to device computer 52 over network 50 for use. Alternatively, server computer 54 can be a web server, and the program code, and programs such as query program 66 may be stored on at least one of the one or more storage devices 830 on server computer 54 and accessed device computer 52. In other exemplary embodiments, the program code, and programs such as query program 66 may distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 3:
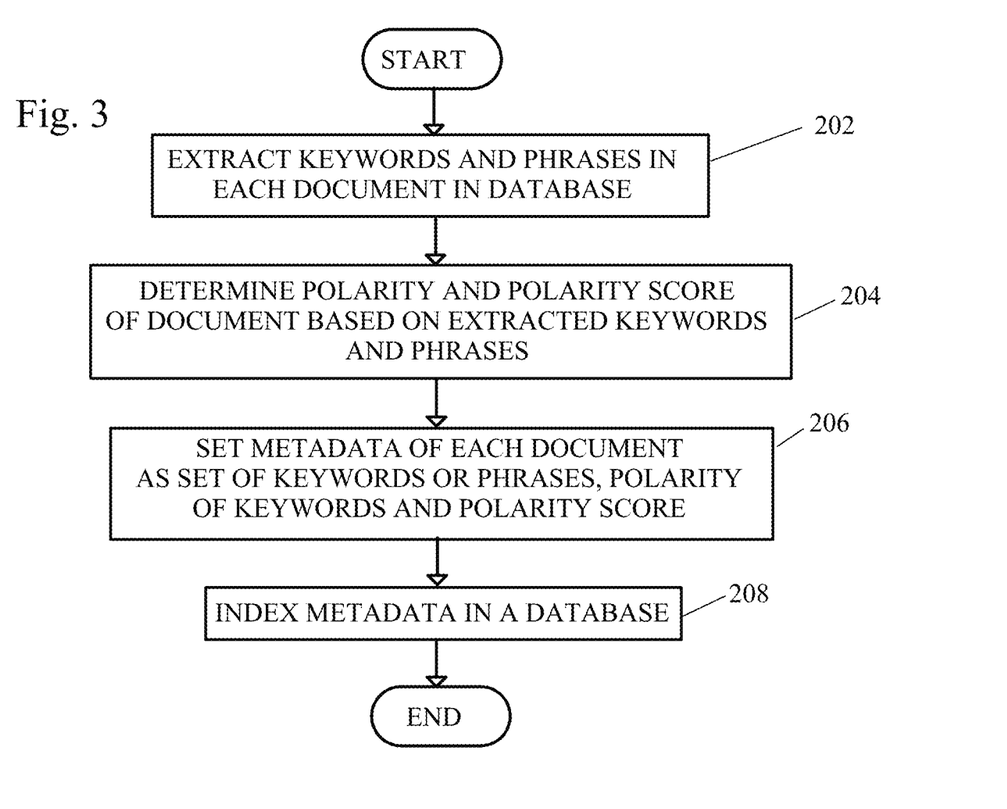
FIG. 3 shows flowchart of a method of indexing documents with metadata.

FIG. 3 shows flowchart of a method of indexing documents with metadata. It should be noted that the steps of FIG. 3 are only executed once per electronic document, irrespective of the query being processed.

In a first step, keywords or phrases are extracted from each electronic document in a document database (step 202). The document database preferably includes all the electronic documents on the web.

The polarity or sentiment is determined for each of the keywords and phrases extracted from the electronic document and a polarity score is calculated for each keyword or phrase based on the use of the keywords and phrases within the document (step 204).

In an embodiment, a rank and retrieve service of the output composition 75 of the query processing engine 58 could be used to achieve this functionality. More specifically, 'Keyword extraction' could be used to extract the keywords present in each document. The rank and retrieve service could also be used to extract the sentiment type (positive, neutral, & negative) of each keyword, along with the polarity score (between 0 to 100). Given a document, it is possible to find the polarity and its score using API's and open source tools available. The query may receive a limited number of characters. The polarity may be positive, negative or neutral.

The metadata of each document is then set as the keywords/phrases in a document, polarity of each keyword in the document along with the polarity score and is stored in a database or repository (step 206).

The metadata stored for each of the documents is then indexed (step 208) for quick access during the user query processing at a later time, increasing the efficiency of the server computer in executing the search, especially when server computer is executing multiple queries simultaneously.

Figure 4:
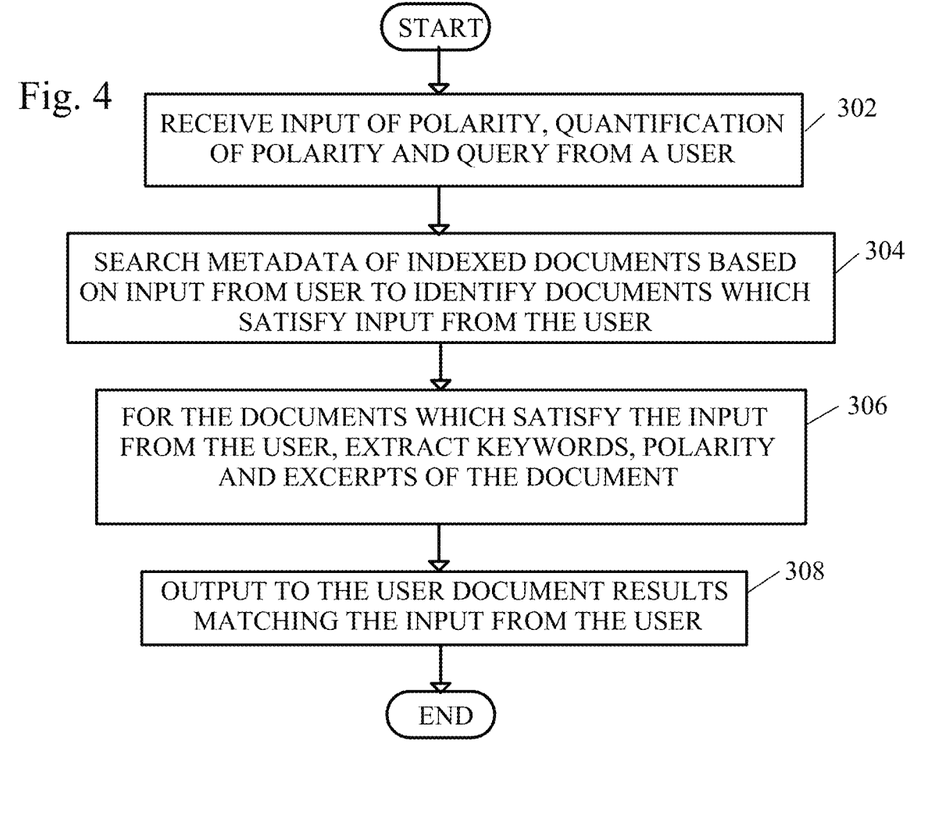
FIG. 4 shows a flowchart of a method of multi-dimensional query based extraction of polarity-aware content.

FIG. 4 shows a flowchart of a method of multi-dimensional query based extraction of polarity-aware content.

It should be noted that prior to the flowchart of FIG. 4, the, processing and indexing of documents based on meta-data takes place.

In a first step, the polarity and context aware content recommendation system 57 receives an input of polarity, quantification of polarity (polarity score) and query from the user containing at least one keyword or phrase via a user interface (step 302).

The polarity and context aware content recommendation system 57 searches the metadata of indexed documents based on the input from the user to identify documents which satisfy at least some of the input from the user (step 304).

For the document which satisfy at least some of the input from the user, the polarity and context aware content recommendation system 57 extracts keywords, polarity associated with the keywords, and the relevant excerpts of each of the documents from the database of documents (step 306). The relevant excerpts preferably include the keywords and text containing polarity context.

The polarity and context aware content recommendation system 57 via the output composition function 75 outputs the search results to the user via the user interface (step 308) and the method ends. The search results may be ordered based on the polarity score, number of keywords found in each of the documents or some other criteria as discussed above.

FIG. 5 illustrates internal and external components of a device computer 52 and server computer 54 in which illustrative embodiments may be implemented. In FIG. 1, a device computer 52 and a server computer 54 include respective sets of internal components 800*a*, 800*b* and external components 900*a*, 900*b*. Each of the sets of internal components 800*a*, 800*b* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and query program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Query program 66 can be stored on one or more of the portable computer-readable tangible storage devices 936, read via R/W drive or interface 832 and loaded into hard drive 830.

Each set of internal components 800*a*, 800*b* also includes a network adapter or interface 836 such as a TCP/IP adapter card. Query program 66 can be downloaded to the device computer 52 and server computer 54 from an external computer via a network (for example, the Internet, a local area network or other, wide area network) and network adapter or interface 836. From the network adapter or interface 836, query program 66 is loaded into hard drive 830. Query program 66 can be downloaded to the server computer 54 from an external computer via a network (for example, the Internet, a local area network or other, wide area network) and network adapter or interface 836. From the network adapter or interface 836, query program 66 is loaded into hard drive 830. The network may comprise copper wires, optical fibers, wireless transmission, routers, firewalls, switches, gateway computers and/or edge servers.

Each of the sets of external components 900*a*, 900*b* includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Query program 66 can be written in various programming languages including low-level, high-level, object-oriented or non object-oriented languages. Alternatively, the functions of a query program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of multi-dimensional query based extraction of polarity-aware content from a plurality of documents comprising the steps of:
   a computer receiving an input query tuple comprising: at least one keyword, polarity, and quantification of polarity corresponding to a polarity score from a user via an interface;
   the computer searching metadata of indexed documents based on the input query tuple to identify documents which satisfy at least some of the input query tuple;
   for each document which satisfies at least some of the input query tuple from the user, the computer extracting keywords, polarity associated with the keywords, and excerpts of each of the documents including the keywords and text containing polarity context associated with the keywords; and
   the computer outputting for each document which satisfies at least some of the input of the input query tuple, the query results to the user via the user interface;
   wherein the query results outputted to the user are ordered such that, the documents with the highest polarity score are at a top of a list, followed by documents that contain all of the keywords of the input query tuple and a polarity score greater than the polarity score of the input query tuple; followed by documents which contain some of the keywords, associated polarity and polarity score, but not all of the keywords, followed by documents that contain some of the keywords and polarity, but not the polarity score, followed by documents that contain the keywords, but do not contain the polarity or polarity score of the input query tuple.

2. The method of claim 1, further comprising, prior to the step of the computer receiving the input query tuple comprising: the at least one keyword, the polarity, and the quantification of polarity corresponding to the polarity score from the user via the interface, comprising the steps of:
   the computer extracting at least one word from each document in a document database comprising a plurality of documents;
   the computer determining, for each word extracted, polarity of the word based on the document;
   the computer calculating a polarity score for each word extracted within the document; and
   the computer setting and indexing, for each document in the document database, the at least one word extracted, the polarity associated with the word within the document, and the polarity score for each word extracted from the document as searchable metadata.

3. The method of claim 1, wherein the query results outputted to the user comprises: a list of keywords which were used as the query; and search results comprising: keywords present within the document, polarity associated with the keywords present within the document; and polarity scores for each of the keywords present within the document.

4. The method of claim 3, wherein the search results further comprises at least one excerpt from the document containing the keywords and associated polarity context in which the polarity scores and polarity are based.

5. The method of claim 1, wherein when more than one document contains all of the keywords of the input query tuple and a polarity score greater than the polarity score of the input query tuple, the documents are further ordered by ranking the documents having a smaller number of keywords absent from the input query tuple with greater priority.

6. A computer program product for multi-dimensional query based extraction of polarity-aware content from a plurality of documents executed by a computer comprising at least one processor, one or more memories, one or more computer readable storage media, the computer program product comprising a computer readable storage medium having program instructions embodied therewith, the program instructions executable by the computer to perform a method comprising:
   receiving, by the computer, an input query tuple comprising: at least one keyword, polarity, and quantification of polarity corresponding to a polarity score from a user via an interface;
   searching, by the computer, metadata of indexed documents based on the input query tuple to identify documents which satisfy at least some of the input query tuple;
   for each document which satisfies at least some of the input query tuple from the user, extracting, by the computer, keywords, polarity associated with the keywords, and excerpts of each of the documents including the keywords and text containing polarity context associated with the keywords; and
   outputting, by the computer, for each document which satisfies at least some of the input of the input query tuple, the query results to the user via the user interface;
   wherein the query results outputted to the user are ordered such that, the documents with the highest polarity score are at a top of a list, followed by documents that contain all of the keywords of the input query tuple and a polarity score greater than the polarity score of the input query tuple; followed by documents which contain some of the keywords, associated polarity and polarity score, but not all of the keywords, followed by documents that contain some of the keywords and polarity, but not the polarity score, followed by documents that contain the keywords, but do not contain the polarity or polarity score of the input query tuple.

7. The computer program product of claim 6, further comprising, prior to the program instructions of receiving, by the computer, the input query tuple comprising: the at least one keyword, the polarity, and the quantification of polarity corresponding to the polarity score from the user via the interface, comprising the program instructions of:
   extracting, by the computer, at least one word from each document in a document database comprising a plurality of documents;
   determining, by the computer, for each word extracted, polarity of the word based on the document;
   calculating, by the computer, a polarity score for each word extracted within the document; and
   setting and indexing, by the computer, for each document in the document database, the at least one word extracted, the polarity associated with the word within the document, and the polarity score for each word extracted from the document as searchable metadata.

8. The computer program product of claim 6, wherein the query results outputted to the user comprises: a list of keywords which were used as the query; and search results comprising: keywords present within the document, polarity associated with the keywords present within the document; and polarity scores for each of the keywords present within the document.

9. The computer program product of claim 8, wherein the search results further comprises at least one excerpt from the document containing the keywords and associated polarity context in which the polarity scores and polarity are based.

10. The computer program product of claim 6, wherein when more than one document contains all of the keywords of the input query tuple and a polarity score greater than the polarity score of the input query tuple, the documents are further ordered by ranking the documents having a smaller number of keywords absent from the input query tuple with greater priority.

11. A computer system for multi-dimensional query based extraction of polarity-aware content from a plurality of documents comprising a computer comprising at least one processor, one or more memories, one or more computer readable storage media having program instructions executable by the computer to perform the program instructions comprising:
- receiving, by the computer, an input query tuple comprising: at least one keyword, polarity, and quantification of polarity corresponding to a polarity score from a user via an interface;
- searching, by the computer, metadata of indexed documents based on the input query tuple to identify documents which satisfy at least some of the input query tuple;
- for each document which satisfies at least some of the input query tuple from the user, extracting, by the computer, keywords, polarity associated with the keywords, and excerpts of each of the documents including the keywords and text containing polarity context associated with the keywords; and
- outputting, by the computer, for each document which satisfies at least some of the input of the input query tuple, the query results to the user via the user interface;
- wherein the query results outputted to the user are ordered such that, the documents with the highest polarity score are at a top of a list, followed by documents that contain all of the keywords of the input query tuple and a polarity score greater than the polarity score of the input query tuple; followed by documents which contain some of the keywords, associated polarity and polarity score, but not all of the keywords, followed by documents that contain some of the keywords and polarity, but not the polarity score, followed by documents that contain the keywords, but do not contain the polarity or polarity score of the input query tuple.

12. The computer system of claim 11, further comprising, prior to the program instructions of receiving, by the computer, the input query tuple comprising: the at least one keyword, the polarity, and the quantification of polarity corresponding to the polarity score from the user via the interface, comprising the program instructions of:
- extracting, by the computer, at least one word from each document in a document database comprising a plurality of documents;
- determining, by the computer, for each word extracted, polarity of the word based on the document;
- calculating, by the computer, a polarity score for each word extracted within the document; and
- setting and indexing, by the computer, for each document in the document database, the at least one word extracted, the polarity associated with the word within the document, and the polarity score for each word extracted from the document as searchable metadata.

13. The computer system of claim 11, wherein the query results outputted to the user comprises: a list of keywords which were used as the query; and search results comprising: keywords present within the document, polarity associated with the keywords present within the document; and polarity scores for each of the keywords present within the document.

14. The computer system of claim 13, wherein the search results further comprises at least one excerpt from the document containing the keywords and associated polarity context in which the polarity scores and polarity are based.

15. The computer system of claim 11, wherein when more than one document contains all of the keywords of the input query tuple and a polarity score greater than the polarity score of the input query tuple, the documents are further ordered by ranking the documents having a smaller number of keywords absent from the input query tuple with greater priority.

\* \* \* \* \*